UNITED STATES PATENT OFFICE.

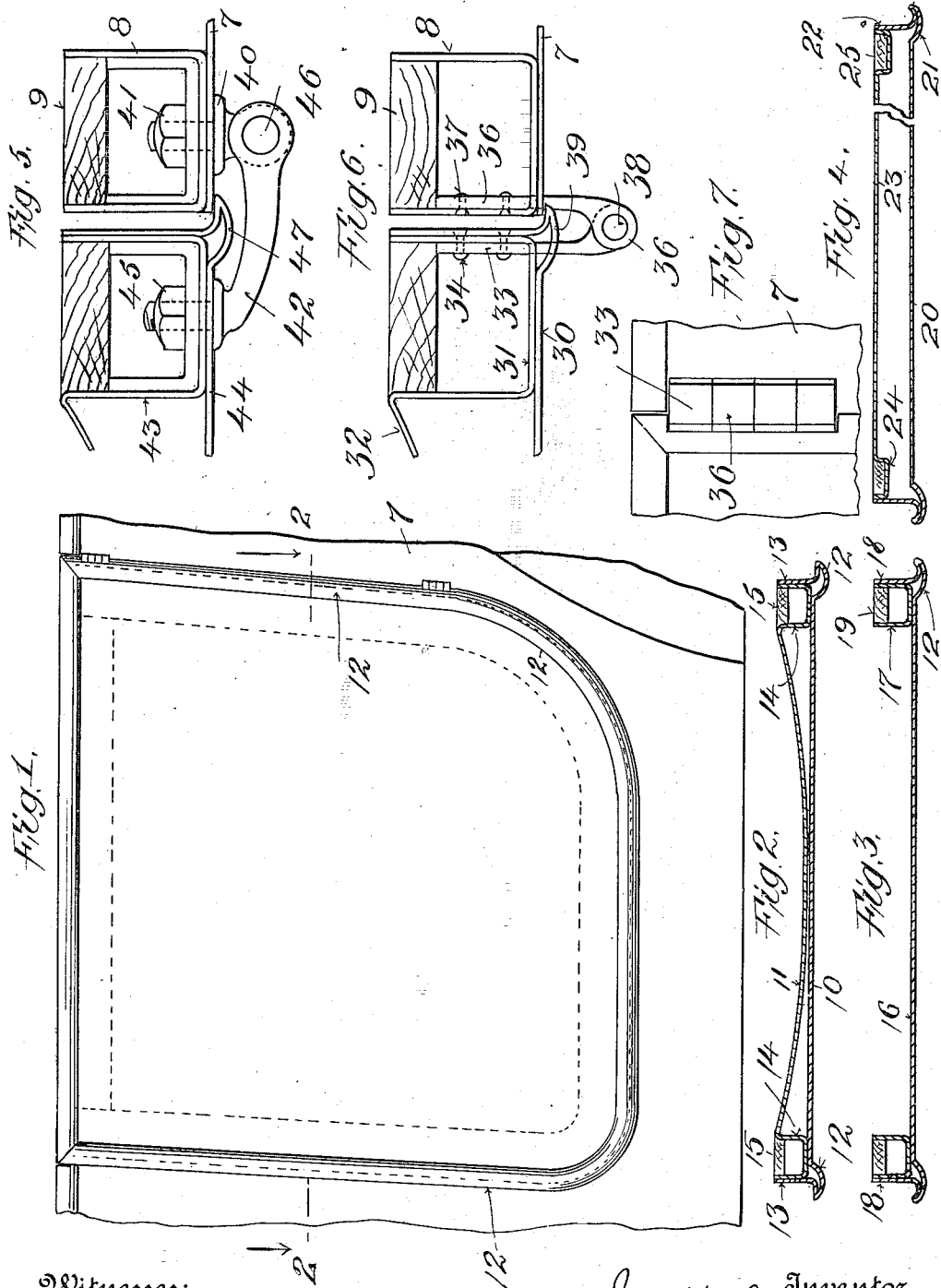

JOSEPH LEDWINKA, OF PHILADELPHIA, PENNSYLVANIA.

METALLIC DOOR FOR AUTOMOBILE-BODIES.

1,127,904.  Specification of Letters Patent.  Patented Feb. 9, 1915.

Application filed February 25, 1913. Serial No. 750,525.

*To all whom it may concern:*

Be it known that I, JOSEPH LEDWINKA, a citizen of the United States, residing at Philadelphia, county of Philadelphia, State of Pennsylvania, have made a certain new and useful Invention in Metallic Doors for Automobile-Bodies, of which the following is a specification.

This invention relates to metallic doors for automobile bodies.

The object of the invention is to provide a strong and durable sheet metal door for automobile bodies.

A further object of the invention is to simplify and improve the structure of automobile body doors, and to render the same more economical to manufacture.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the accompanying drawing:—Figure 1, is a broken view in side elevation, showing the application of a metallic door embodying my invention to an automobile body. Fig. 2, is a view in transverse horizontal section of the door on the plane of line 2, 2, Fig. 1, looking in the direction of the arrows. Fig. 3, is a view similar to Fig. 2, showing a modified arrangement of door, embodying the principles of my invention. Fig. 4 is a view similar to Figs. 2 and 3, showing a further modification embraced within the extent and scope of my invention. Fig. 5, is a broken detail view in section, showing an arrangement for hinging a door constructed in accordance with my invention to the automobile body. Fig. 6 is a view similar to Fig. 5, showing a modified arrangement of hinge structure embodying the principles of my invention. Fig. 7, is a similar view in side elevation of the construction shown in Fig. 6.

The same part is designated by the same reference sign wherever it occurs throughout the several views.

Referring to the drawing, reference numeral 7 designates the automobile body. At the door opening, or surrounding the same, the automobile body is provided with a channel portion 8, which forms a border for the body surrounding the door opening. This channel member 8, is preferably formed of sheet metal and is U-shaped in cross section, as shown most clearly in Figs. 5 and 6, and a wooden strip 9, is placed within the channel member 8, to afford means for attaching the lining or cushion to the interior surface of the body.

The door of the construction shown in Fig. 2, is composed of the two pans or plates 10, 11, formed of sheet steel. The outer pan or sheet 10, is pressed into shape to form an out turned projecting rib or ledge 12, at the peripheral or bounding edge thereof, to form a bead or molding for ornamental purposes. The extreme edge of the outer sheet 10, is inturned to form the pan as indicated at 13, thereby forming a peripheral seat at its bounding edge. The inner sheet or plate 11, is pressed into shape to form a channel portion 14, at the peripheral edge thereof, which is received in the seat formed by the flange 13, of the outer panel or pan, the two pans or portions being welded or otherwise suitably secured together where channel portion 14, of the inner flange contact with the flange 13, or with the body portion of the outer portion or pan 10. In order to secure stiffness and rigidity without unnecessary thickness of metal for the purpose, the inner pan 11, is preferably curved or concaved intermediate its bounding edges, as clearly shown in Fig. 2, thereby forming a stiffened rigid structure of door without undue weight. Seated within the channel portion 14, of the inner pan is a wooden filler strip 15, for affording means for attaching the lining or other finish to the interior surface of the door.

In Fig. 3, only one sheet 16 is employed, the inner sheet being ommitted. In this case, however, the sheet or panel 16 is formed with a bounding head portion 12, similar to that above described with reference to the construction shown in Fig. 2, and in place of the inner sheet or pan 11, a simple channel portion 17, is employed, which bounds the edge of the pan 16 and is seated against the inturned flange 18 thereof, said flange 18 corresponds in structure and function to flange 13, described with reference to Fig. 2.

The channel portion 17, of the construction shown in Fig. 3, is welded or otherwise suitably secured to the surface of the pan portion 16, and that of the inturned flange portion 18, where said parts contact, and is provided with a wooden or other suitable filler strip 19, for a purpose similar to that with respect to filler strip 15, of Fig. 2.

In Fig. 4, I have shown the outer pan 20, having the bounding bead portion 21, and flange 22 similar in all respects to the corresponding features of the outer pan of Figs. 2 and 3, and I also show in Fig. 4, an inner pan portion 23, which is pressed or formed at its bounding edge into a channel portion 24, in which is seated a filler strip 25. The inner pan portion 23, being a straight pan or sheet instead of being curved or bent as in Fig. 2. The channel portion 24, of the inner pan 23, is welded or otherwise suitably secured to the surface of flanged portion 22, of the outer pan where these parts contact.

A door structure such as above described is very cheaply and economically built and assembled together, is strong, durable and rigid, while at the same time avoiding unnecessary weight and forms a most efficient closure for the side door opening of an automobile body. In addition, such a structure affords a most efficient means for hinging the door to the side or body of the automobile, allowing the application of the hinge connections without marring or cutting or fitting adjacent surfaces of the door or body. Structures of the hinge connections of the door to the automobile body are shown in Figs. 5, 6 and 7 wherein it will be observed that holes or openings referring particularly to Fig. 6, are provided through the outer shell or pan 30, for instance, as well as the channel member 31, of the inner pan portion 32. Through these openings extend the shanks 33, of one hinge member. This shank is suitably secured to the end wall of the channel portion 31, by riveting or otherwise, as indicated at 34. By reason of extending into the interior of the channel portion 31, the shank of the hinged portion is concealed from view, and besides the cutting or fitting of a seat to receive the same in the edge of the door is avoided. Similarly, the bounding channel 8 surrounding the door opening in the automobile body 7, has an opening formed therethrough and a corresponding opening is also formed through the body 7, through which openings shank section 36 of the coöperating hinge member projects, and which is similarly secured, by riveting or otherwise, as indicated in 37, to the outer wall of the channel member 8. Thus, provision is made for attaching the hinge member 36, to the automobile body, or the bounding edge of the door opening thereof, without cutting or fitting a seat therefor in the automobile body. The two hinge members 33, 36 are then hinged together, as at 38, in the usual or any well known manner. In this construction it will be observed that the bead 39, which bounds the edge of the pan or sheet portion 30, covers the joint between the door and the proximate edge of the body opening thereby forming a neat finish.

In Fig. 5, a modified arrangement of hinge connection is employed wherein one hinge member 40, is suitably bolted through the channel member 8, and the body portion 7, the securing nut 41, thereof, being located within the channel of member 8. Similarly, the other portion 42, of the hinge is bolted through the channel portion 43, of the door structure and through the outer panel 44 of said structure, and the securing nut 45 thereof, being located within the channel of member 43, the two hinged portions 42, 40 being secured together by a hinge connection 46, in the usual manner. In this instance, the bead portion 47, similarly covers and conceals the joint between the door structure and the bounding portion of the door opening in the body of the automobile.

A construction as above described permits the door to be made entirely of pressed steel and without depending on wood at any portion thereof for strength. It also enables the door to be constructed very cheaply and which is strong, durable, rigid and capable of withstanding a rough usage to which automobiles are ordinarily subjected while in use, while at the same time, being made light in weight.

Having now set forth the objects and nature of my invention, and various constructions embodying the principles thereof, what I claim as new and useful and of my own invention and desire to secure by Letters Patent is:—

1. A sheet metal door for automobile bodies having an inturned flange at the bounding edge thereof and an independent member secured to the inturned portion thereof, said independent member formed into channel shape, the channel presenting away from the door body.

2. A sheet metal door for automobile bodies, having a channel portion secured to the bounding edge thereof, the channel of said portion presenting away from the door body, and a filler strip seated in said channel.

3. A sheet metal door for automobile bodies, having an integral bead portion at the peripheral bounding edge thereof, terminating in an inturned flange, forming a seat, and an independent member secured in said seat and formed into channel shape, the channel presenting away from the door body.

4. A sheet metal door for automobile bodies, having a flange at the bounding edge thereof to form a seat, an inner sheet metal portion having a channel formed at the bounding edge thereof, one of the side walls of said channel being secured to the flange of the outer portion.

5. A sheet metal door for automobile bodies, comprising an outer and an inner pan portion, the inner pan portion having a channel formed at the bounding edge thereof, one of the side walls of said channel portion being secured to the edge of the outer sheet or pan portion.

6. A sheet metal door for automobile bodies including an outer portion having an inturned flange at the bounding edge thereof and an inner portion formed with a channel at the bounding edge thereof, the outer side wall of said channel portion being secured to the inner surface of the inturned flange of the outer portion.

7. A sheet metal door for automobile bodies, an outer sheet metal portion having an inturned bounding flange at the edge thereof, and an inner sheet metal portion having a channel formed therein at the bounding edge thereof, the outer wall of said channel being secured to the inner surface of the flange of the outer portion, said inner panel portion being transversely curved or bent.

8. A sheet metal door for automobile bodies including a body part and an independent channel member attached to the bounding edge thereof and presenting away from said body part and a hinge member having its shank extending through said body portion and into the channel member and secured thereto in combination with the automobile body having an independent channel member secured thereto to form the bounding edge of the door opening therein and a hinge member having the shank thereof extending through the body and into the channel member, said hinge members being pivotally connected together.

9. The combination with a sheet metal door for automobile bodies, and an independent outwardly presenting channel member secured to the bounding edges thereof, of an automobile body having a channel member forming the bounding edge of the door opening and hinge, and hinge members respectively secured within said channels and pivotally connected together.

10. The combination with a sheet metal door having an independent channel shaped member secured to the bounding edge thereof, the channel of said member presenting outwardly, of a body portion having a corresponding channel member secured to the bounding edge of the door opening therein, and hinge members extending respectively into said channel members and secured therein and pivotally connected together, said door having a bead portion to conceal the joint between the door and the body portion.

In testimony whereof I have hereunto set my hand in the presence of the subscribing witnesses, on this 14th day of February A. D., 1913.

JOSEPH LEDWINKA.

Witnesses:
S. K. THOMPSON,
J. MARMION.